United States Patent [19]
Elliott

[11] 3,764,873
[45] Oct. 9, 1973

[54] ELECTRICAL MOTOR CIRCUITS
[75] Inventor: Royston David Elliott, Basingstoke, England
[73] Assignee: Lansing Bagnall Limited, Basingshire, England
[22] Filed: Feb. 29, 1972
[21] Appl. No.: 230,288

[30] Foreign Application Priority Data
    Apr. 4, 1971    Great Britain..................... 6,044/71

[52] U.S. Cl................................. 318/252, 318/366
[51] Int. Cl. ............................................. H02p 1/22
[58] Field of Search.................... 318/138, 139, 252, 318/297–300, 366, 367, 434, 476, 612, 613, 463

[56] References Cited
UNITED STATES PATENTS
3,536,980  10/1970  McKenzie........................... 318/613
3,504,257  3/1970  Smith................................... 318/252
3,424,959  1/1969  Gruner................................ 318/613

Primary Examiner—Bernard A. Gilheany
Assistant Examiner—W. E. Duncanson, Jr.
Attorney—John W. Malley et al.

[57] ABSTRACT

A motor which is pulse-operated by chopper circuits connected to its field windings has a safety circuit which has two possible oscillatory loops. One loop is coupled to thyristors in the chopper circuit and another loop is coupled to the output of an armature current sensor. Bias circuits disable the loops when the thyristors are conductive and armature current is too high. A normally closed relay is kept closed only when the safety circuit oscillates. Cessation of oscillations opens the relay which thereupon disables the motor. The safety circuit is self-checking; if it is itself inoperative the motor is still disabled.

6 Claims, 2 Drawing Figures

ELECTRICAL MOTOR CIRCUITS

BACKGROUND OF THE INVENTION

This invention relates to safety circuits for pulse-operated electric motors.

As is well known a pulse-operated electric motor is normally controlled by thyristors or other electronic or semi-conductive valves which are fed with operating pulses and thereby chop the supply of current to the motor into intermittent pulses. The specifications of U.S. Pat. Nos. 3441827, 3562616 and 3601658 describe examples of such arrangements. The electrical circuit for controlling such a motor must normally include a safety circuit which prevents the driving of the motor if a particular fault occurs, and the aforementioned patents describe some examples.

Although many different safety circuits can be incorporated, there remains a serious problem, in that a safety circuit itself may be or become faulty and fail to detect a fault in the circuit which it monitors or fail to de-energise the motor.

SUMMARY OF THE INVENTION

The present invention is accordingly concerned with the provision of a self-checking safety circuit which includes at least one oscillatory loop coupled to the circuit that it monitors and to a relay for disabling the motor.

Relatively high frequency signals can traverse the loop only if the elements and the safety circuit itself are in correct operative conditions. These signals will not adversely affect the normal operation of the motor and its circuit. Should any fault, even in the safety circuit itself, occur, the oscillations stop and the relay operates to disable the motor.

The main conditions that must be monitored by a safety circuit consist normally of an excessive armature current and the conduction of the switching elements in the chopper circuit. For this purpose the safety circuit may have two oscillatory loops, one coupled to the chopper circuits and one coupled to respond to the output of an armature current sensor, and disabling of the motor may be effected only if both loops are disabled.

Preferably the motor has two opposed series field windings and a means for disabling the motor is constituted by a relay arranged to short circuit these windings together, so that substantially zero field flux results.

BRIEF DESCRIPTION OF THE ACCOMPANYING DRAWINGS

FIG. 1 is a diagram of a typical pulse controlled motor and its associated driving circuit; and FIG. 2 is a schematic diagram of a safety circuit for use with the circuit of FIG. 1.

DESCRIPTION OF THE PREFERRED EMBODIMENT

Figure 1:
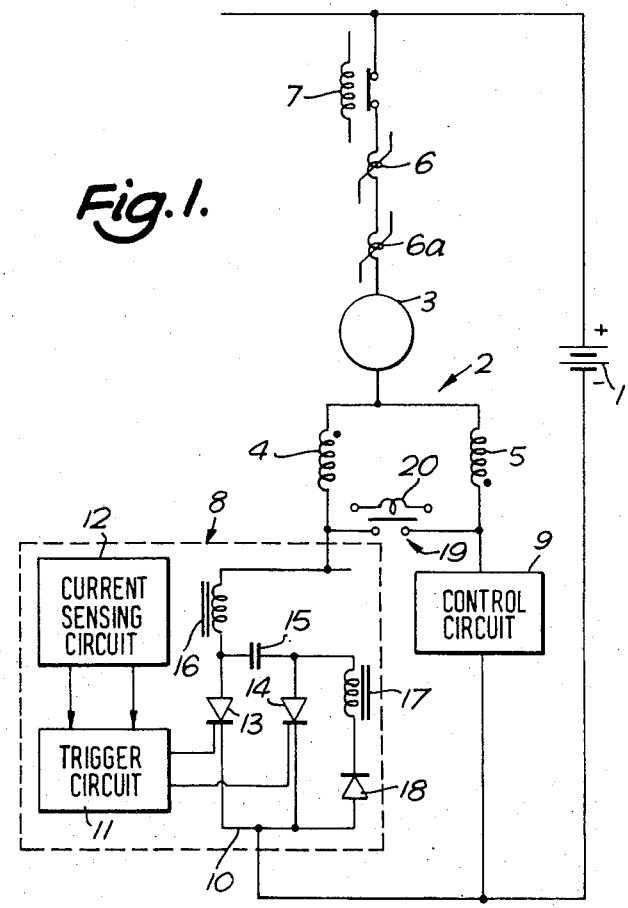

FIG. 1 illustrates, in the main, a well known configuration of a motor and its control circuit. A battery 1 can supply current to a series wound motor 2 consisting of an armature 3 and two opposed series field windings 4 and 5. One field winding of the motor is energised for each direction, forward or reverse, of movement of the motor. Two coils 6 and 6a are in series with the armature to provide magnetic flux corresponding to the armature current to respective regulating circuits described hereinafter. A relay, usually called 'line contactor,' 7 has its contacts in series with the battery. One of two similar control circuits 8 and 9 is associated with each field winding. These chopper circuits are each comprised of a chopper circuit 10, a trigger circuit 11 and a current sensing circuit 12 of which one of the coils 6 and 6a forms a part.

The chopper circuit 10 consists principally of a thyristor 13, which is rendered conductive, allowing armature current to flow in the motor, by a pulse to its gate, a thyristor 14, which is rendered conductive by a pulse to its gate and a capacitor 15 which is connected between the anodes of the thyristor and causes the extinction of the conduction of one thyristor when the other thyristor, whichever it may be, is rendered conductive. For this purpose it is desirable to charge the capacitor towards the battery's voltage when the thyristor 13 is conductive and accordingly the circuit includes a transformer, whose primary 16 is in series with the thyristor 13 and whose secondary 17 is in series with a diode 18 in a branch parallel to the thyristor 14.

In the current sensing circuit the respective coil, 6 or 6a, produces magnetic flux through a magnetically sensitive resistor arranged in a potential dividing circuit energised by a constant voltage. The trigger circuit is responsive to the voltage across part of the divider and develops an operating pulse followed by an extinguishing pulse which are respectively fed to the thyristors 13 and 14 of the associated chopper circuit when the sensed voltage falls below a value (such as twelve volts) associated with a relatively small armature current.

The circuit as thus far described by way of example corresponds to the relevant parts of the circuit described in the aforementioned U.S. Pat. No.3562616 the disclosure of which is incorporated herein by reference.

The circuit of FIG. 1 also includes a relay 19 of which the coil 20 is normally energized to keep the relay open. The relay is closable to short circuit the ends, of the field windings, remote from the armature 3. Any current circulating in the thereby constituted loop of two windings will cause equal and opposite torques on the armature, so that the motor is then effectively disabled.

Figure 2:
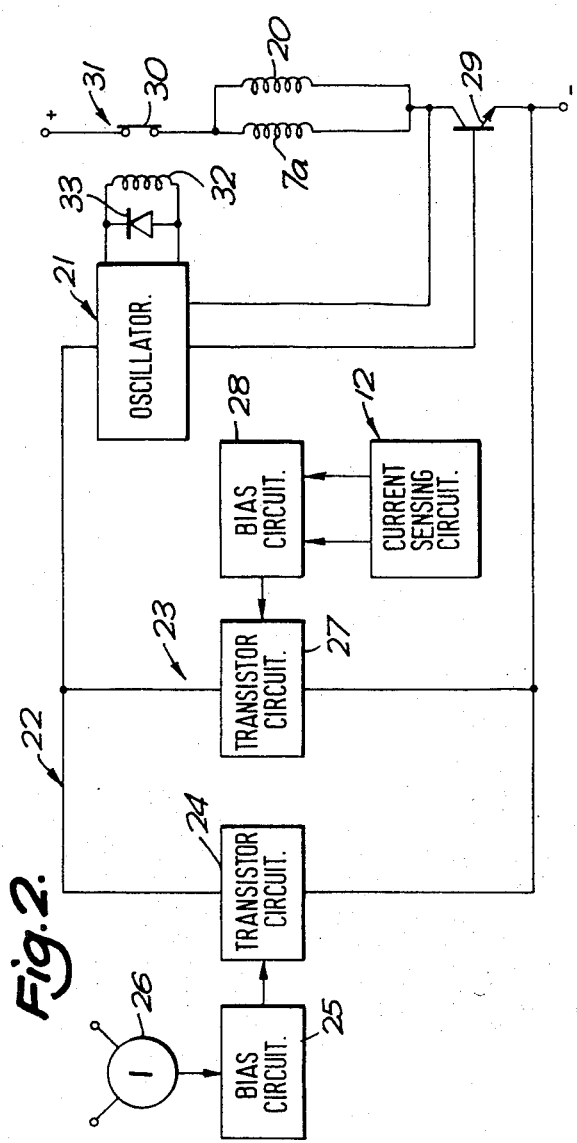

FIG. 2 illustrates, partly schematically, the safety circuit. It comprises a square wave transistor oscillator 21 which requires for the maintenance of oscillations an untrammelled passage of signals around at least one of two feedback loops 22 and 23. One loop 22 is completed by a transistor amplifying circuit 24 which is coupled to a bias circuit. This bias circuit is connected via an OR circuit 26 to the anodes of the main thyristor 13 in each chopper circuit and functions to disable the associated oscillatory loop by turning off the transistor circuit if the potential at the anode junction is low. A continuously low potential at this junction is a condition capable of causing continuous energisation of a low resistance motor circuit and thereby either damage to that circuit or run-away of a truck driven by the motor or both. The other loop is completed by a transistor amplifying circuit 27 which is coupled to a bias circuit 28. This bias circuit is energised from the output of the armature current sensing circuit 12 and if the armature current reaches a limit denoted by an output, from the sensing circuit, of 16 volts, the bias circuit turns off the circuit and thereby disables the associated loop.

Both oscillatory loops, which have been simplified in FIG. 2 for ease of understanding, include the power transistor 29. This transistor drives the coils 7a, 20 of the line contactor 7 and the relay 19 in parallel. These coils are jointly in series with the normally closed contacts 30 of a normally energised relay 31 which is controlled by the oscillator. The relay remains energised provided that the oscillator 21 remains oscillatory. This function can simply be achieved by disposing the relay's coil 32 in series with the collector/emitter circuit of a switching transistor in the oscillator and providing a free-wheel diode 33 across the coil so that provided the transistor switches on repeatedly in accord with the operation of the oscillator the coil receives sufficient current to keep its contacts closed. Various adequate arrangements for this purpose will readily occur to those skilled in the art.

Thus the safety circuit is provided principally to guard against the condition of continuously conductive thyristors and high armature current. Should this condition occur, both the possible oscillatory loops are disabled, the power transistor and the transistor switch off, and the coils are de-energised. No current can reach the motor and any residual current in the motor causes minimal torque owing to the short circuiting together of the opposed field windings.

It will be appreciated that the disabling of the loops is not dependent on any particular construction of armature current sensing circuit or use of any particular chopper circuit but merely consists in the sensing of an appropriate operating voltage. Thus the general principle of disabling the loop can be extended to almost any part of the motor or its associated circuit.

Normally the pulses energising the motor each last about 1 millisecond; the square wave oscillator can, for example, generate pulses which last for 120 micro seconds, separated by spaces of between ten and forty micro seconds. Thus these latter pulses are at a frequency high relative to the pulse-operating frequency of the motor.

I claim:

1. A circuit comprising a motor, a control circuit for energising the motor with pulses of current, a safety circuit for monitoring selected elements of the control circuit and a relay for disabling the motor, in which the safety circuit is oscillatory at a relatively high frequency and includes at least one closed loop and means for disabling the loop on the occurrence of predetermined conditions in the control circuit; and in which the said relay is operative to disable the motor in the absence of oscillation by the oscillatory safety circuit.

2. A circuit according to claim 1 in which the control circuit includes a thyristor in series with the motor and a sensing circuit coupled to sense the motor's armature current and provide an output dependent thereon, in which the oscillatory safety circuit includes two alternative oscillatory loops, means for disabling one of the loops when said thyristor is conductive and means for disabling the other loop when said output reaches a preset level.

3. A circuit according to claim 1 in which the said relay is normally open and energised and is arranged when closed to short circuit together the ends of two opposed series field windings of the motor.

4. A circuit comprising a direct current motor with an armature and at least one field winding; a control circuit for energising the motor with pulses of current, said control circuit including a first thyristor in series with said field winding; means for rendering said thyristor intermittently conductive; means for sensing current in said armature; switch means having an open energised state and a closed de-energised state, said switch means effecting disabling of said motor when in said closed de-energised state; a safety circuit comprising an oscillator having first and second alternative feedback loops; bias means coupling said thyristor to said first loop for disabling same on conduction of said thyristor; further bias means coupling said means for sensing to said second loop for disabling same on occurrence of a predetermined level of armature current; and means coupling said oscillator to said switch means for de-energising said switch means in the absence of oscillation by said oscillator.

5. A circuit according to claim 4 in which said motor has two series field windings which are jointly coupled at one end to the armature and said switch means includes a relay for connecting the other ends of the windings together.

6. A circuit comprising a direct current source, a direct current motor with an armature and two opposed series field windings having first ends jointly coupled to the armature and second ends, current chopper circuits between each of said second ends and said source of direct current, means for selecting one or other of said current chopper circuits for operation, means for supplying pulses to one or other of said windings selectively, and a relay having an open energized state and a closed de-energized state, said relay in said closed state connecting said second ends together.

* * * * *